INVENTOR.
CHARLTON A. TAYLOR
BY
Christy, Parmelee and Strickland
HIS ATTORNEYS

United States Patent Office 2,767,073
Patented Oct. 16, 1956

2,767,073

METHOD AND APPARATUS FOR REDUCING IRON ORES BY COUNTER-FLOWING REDUCTION GASES

Charlton A. Taylor, Garrettsville, Ohio

Application June 8, 1953, Serial No. 360,395

15 Claims. (Cl. 75—26)

This invention relates to the reduction of iron ores. More particularly the invention relates to the reduction of iron ores to make sponge iron. The present process is well adapted for the reduction of titaniferous magnetite to recover the iron as sponge iron and to recover the other metal values from the ore without melting or fluxing materials. The invention also is adapted for the treatment of hematite, limonite, marcasite, pyrrhotite, pyrite and siderite.

The usual commercial processes for recovering iron from ores such as magnetite, hematite, pyrite and the like is to reduce such ores in the commonly used blast furnace. In this furnace coke is used for reduction of the ore and fluxes are used to melt with the ore to separate impurities in the form of slag. This reduction operation alloys the reduced iron with other materials present such as carbon, silicon, phosphorus, sulphur and manganese. This iron alloy as produced is commonly known as pig iron. The pig iron is extensively used in the manufacture of steel after treatment in a Bessemer converter or in an open-hearth furnace where part of the alloying impurities, such as carbon, silicon, manganese, phosphorus and sulphur are partially or completely removed.

The primary object of the present invention is to provide a method of and apparatus for reducing iron ores to make a relatively pure iron directly from the ore.

My process is particularly adapted for the recovery of iron from titaniferous magnetite in that a high grade sponge iron can be produced in the reduction and at the same time the titanium oxide and other metal values of the ore can be recovered in practically pure form.

The temperatures developed in the blast furnace reach as high as 3600°–3700° F. at the hearth so that the flux is formed into a slag and the iron alloy is molten. These high temperatures have a direct influence upon the impurities that are absorbed by the pig iron. I have found that the iron and other metals in the ore may be reduced effectively at temperatures of 1800° to 2000° F. without melting the iron or metals or forming a slag. The reduction will deposit the iron in a granular spongy mass so that it may readily be separated from other metals or impurities in the iron ore.

Accordingly a further object of the invention is to provide a method of reducing iron ore to produce sponge iron without melting the iron.

To insure a complete reduction of the iron oxide, the iron ore is reduced to a finely pulverized state (100–500 mesh) before being introduced into the furnace, and mechanism is provided to separate the fine particles to permit a good contact between each particle and the hydrogen or carbon monoxide used for making the reduction.

Another feature of the invention is to distribute the iron ore particles throughout the area of a large vertical furnace and causing the particles to drop through a rising body of hot reducing gas to permit sufficient time for the particles to remain in contact with the reducing gas to complete the reducing reaction.

With these and other objects and features in view, the invention consists in the method of and apparatus for reducing iron ores as hereinafter described and defined in the appended claims.

The various features of the invention are illustrated in the accompanying drawings, in which.

Figure 1:
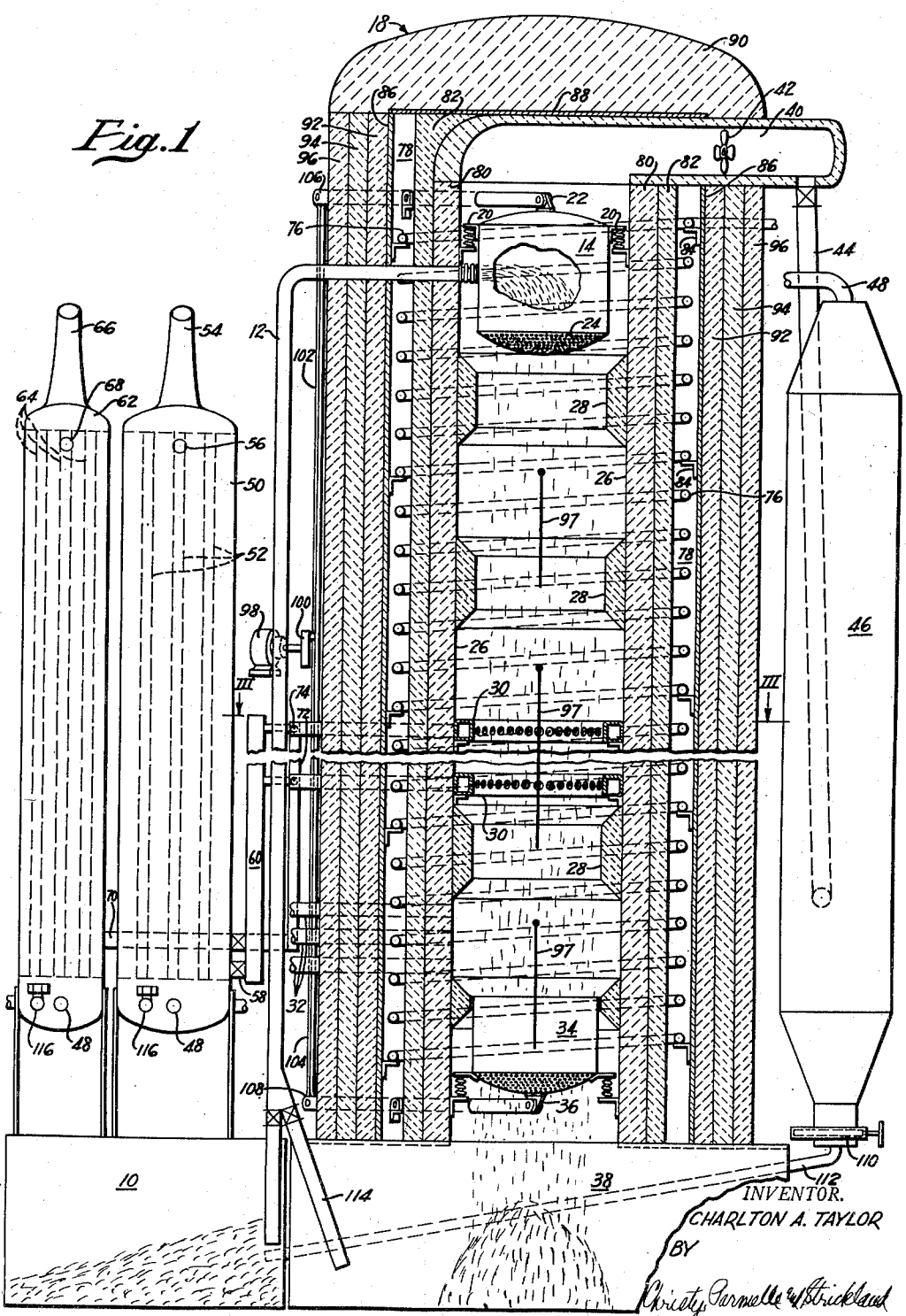
Fig. 1 is a view in side elevation with the furnace shown in section of an apparatus for reducing finely pulverized iron ore with hydrogen.
Figure 2:
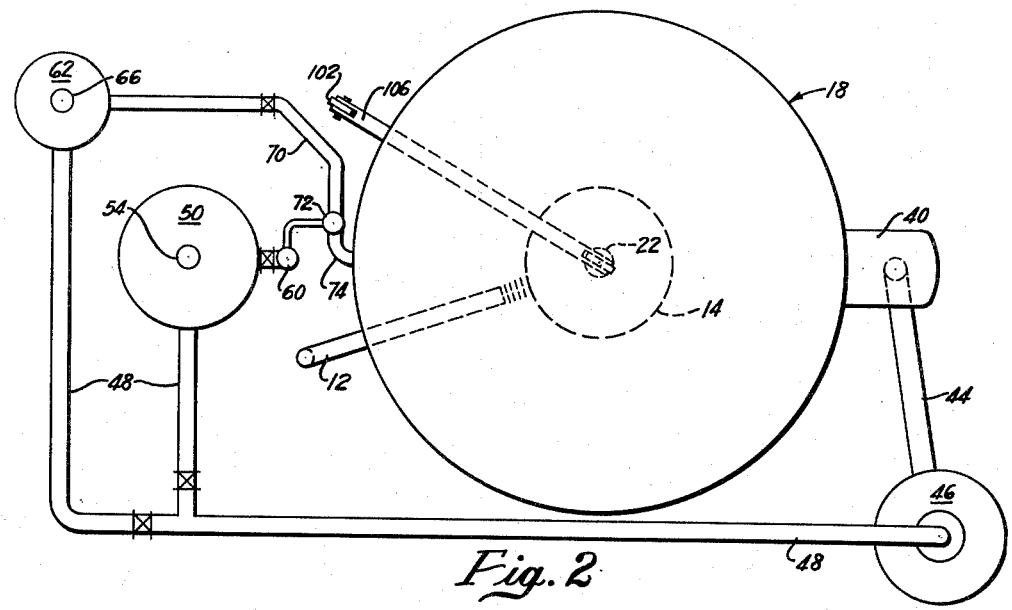
Fig. 2 is a top plan view of the apparatus shown in Fig. 1.
Figure 3:
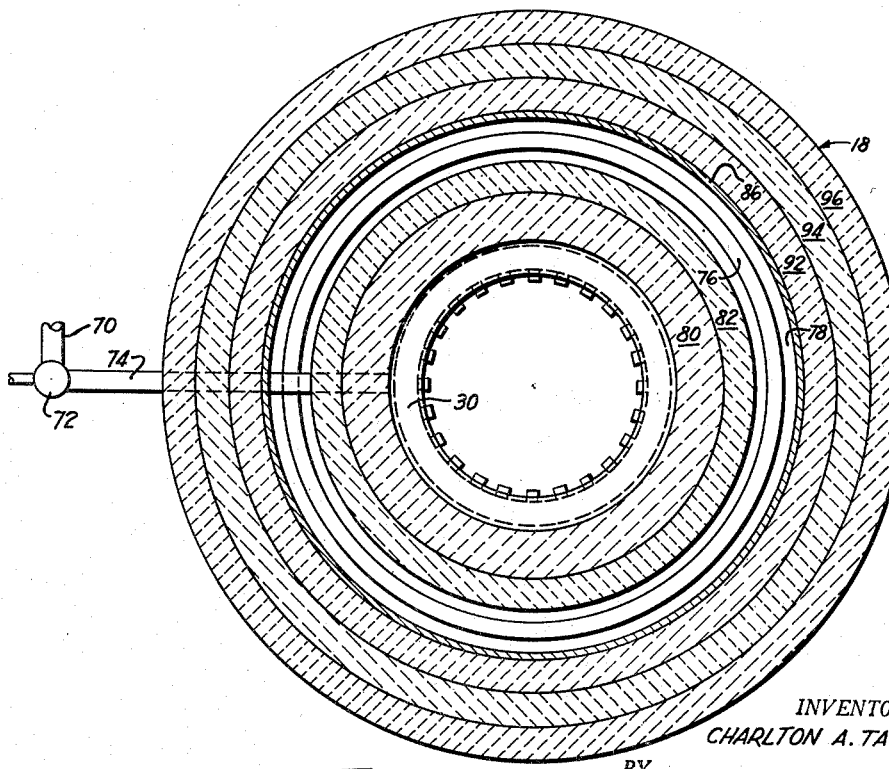
Fig. 3 is a horizontal sectional view of the reducing furnace taken on the line III—III of Fig. 1.

The present process involves reactions such as the following:

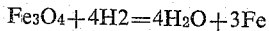
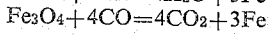

$$Fe_3O_4 + 4H_2 = 4H_2O + 3Fe$$
$$Fe_3O_4 + 4CO = 4CO_2 + 3Fe$$

In order to carry out these reactions without fusing or melting the materials it is important to have the ore in such a condition and to carry on the reaction at such a temperature that the hydrogen or carbon monoxide will react directly with the iron oxide to reduce the oxide to metallic iron. The ore is preferably prepared for treatment by pulverizing it to a fineness of 300 to 500 mesh. With these small particles, and by maintaining a temperature of 1700° to 2000° F. in a reaction zone, the oxygen of the oxide may be united with the reducing gas to set free the metal.

The pulverization of the ore is preferably carried out in a series of stages. By passing the pulverized ore from one stage directly to a following pulverizer adjusted for finer pulverization, a fineness of 500 mesh can be obtained in five stages of grinding. A more uniform product may be obtained by screening the product of one pulverizer before sending it to the next stage pulverizer.

The reducing action is preferably carried out in a vertical shaft furnace which preferably is approximately 100 feet high, and has four zones of reaction. The pulverized ore is taken from a bin 10 and circulated by means of a blower (not shown) through a pipe 12 into a shaker 14 mounted in the top of a vertical shaft reaction chamber 18. The shaker is mounted on springs 20 and tapped at a high rate of tapping by a hammer 22 which strikes the top of the shaker. The bottom of the shaker is provided with perforations 24 which distribute the ore, leaving the shaker in a circular area, so that the particles will fall vertically through the shaft. The outside diameter of the shaker 14 is smaller than the inside diameter of the shaft 18 in order to hold the particles from coming into contact with the inside face 26 of the shaft. Also a series of baffles 28 are mounted on the inside of the shaft in order to guide any particles which pass outside of the circular area, formed by the bottom of the shaker, back into the said vertical area on the inside of the shaft.

As the ore particles fall through the shaft they are heated by a stream of preheated hydrogen which is introduced through burners 30 distributed along the wall 18 in the mid portion of the furnace. Preferably ten to fifteen hydrogen burners 30 are distributed along the mid portion of the furnace in order to introduce the hydrogen in such a form that it will thoroughly penetrate the vertical falling stream of ore particles to carry out the reducing operation. After the particles pass through the zone containing the hydrogen burners, the particles fall through a zone which contains hydrogen as well as nitrogen which is introduced into the shaft through pipes 32. The nitrogen is comparatively cold and acts to reduce the temperature of the iron ore particles which fall into a shaker 34 mounted at the bottom of the shaft 18. The shaker 34 is tapped by a hammer 36 which acts to break up the particles falling into the shaker so that the materials passing through the shaker are received in a comparatively finely pulverized condition in a receiving pit or hopper 38.

The volume of hydrogen introduced into the shaft 18 is such as to provide an excess of from 5 to 15% of hydrogen more than is required for carrying on the reducing action. The volume of nitrogen introduced into the shaft is that volume which is required to reduce the temperature of the reduced ore to a point where it will not be fused or sticky and can be readily broken up in the shaker 34.

An outlet conduit 40 communicates with the top of the shaft, and a suction blower 42 is mounted therein to draw the gases upwardly through the shaft, and to expel the gases outwardly through a pipe 44 into a cyclone separator 46. The pipe 44 enters the separator 46 tangentially so that the solid particles in the gases fall to the bottom of the separator and the separated gas passes out through an outlet pipe 48. The hot waste gas enters the bottom of a heat exchanger 50 through the pipe 48 and passes through a series of tubes 52 to an outlet exhaust pipe 54. The maximum temperature of the gases developed in the shaft at the zone of the hydrogen burners 30 will be approximately 2000° F., and this gas temperature falls as the gases are circulated through the conduit 40 and cyclone separator so that the exhaust gases will heat hydrogen passing around the tubes 52 in the exchanger to a temperature of 500 to 1000° F. The hydrogen enters the heat exchanger 50 through an inlet 56 and leaves the interchanger through a valved outlet 58. The hydrogen flows from the outlet through a distributor 60 which is connected with each of the hydrogen burners in the shaft furnace. Part of the exhaust gases from the separator 46 may pass through the pipe 48 to a heat interchanger 62 which is a tubular heat interchanger, the exhaust gases passing through tubes 64 and then out through an exhaust outlet 66. Air enters the exchanger 62 through an inlet 68 and passes through a valved outlet 70 to a distributing header 72. The distributing header connects with each of a series of inlet pipes 74 connected between the hydrogen and air headers 60 and 72 with the hydrogen burners 30 inside of the shaft. Preferably a venturi type mixer is mounted in the distributing pipes 74 in order to mix the hydrogen with the air.

It will be understood that other reducing gases such as carbon monoxide and water gas, composed of hydrogen and carbon monoxide, may be used for the reducing action in the reaction zone. The carbon monoxide or water gas would be preheated in the regenerator 50 in the same way that hydrogen is preheated, and would have the same path of circulation through the preheater. Carbon monoxide and water gas are preferably generated in the well known water gas set. The hydrogen is preferably generated by passing natural gas through externally heated silicon carbide tubes. This process, known as the "Stookey" process, breaks the gas into hydrogen and carbon, and the carbon can be recovered as a valuable byproduct. Hydrogen can also be generated by a high pressure catalytic decomposition of superheated steam.

It will be understood furthermore that the amount of air to be used in the furnace would only be used and mixed with the combustible reducing gases at the time that the shaft furnace is being preheated to the desired reaction temperature. Air would be mixed with the reducing gases to be burned in the shaft furnace, and as soon as the temperature had been raised to the reaction temperature of approximately 1800° F. the air would be cut off. Thereafter only preheated hydrogen or other reducing gas would be circulated through the burners 30. The reducing reaction wherein the hydrogen combines with the oxygen in the ore involves an exothermic reaction which generates sufficient heat to promote the reaction. Accordingly the amount of cool nitrogen introduced into the lower portion of the shaft furnace is used in controlling the reaction temperature. The reaction temperature furthermore is controlled by means of a cooling coil 76 which is mounted in a chamber 78 that surrounds the shaft furnace. The shaft 18 is made of a layer of refractory brick 80 and insulating brick 82. The cooling coil 76 is supported on brackets 84 which are secured to the inside of a steel shell 86 which surrounds the shaft furnace. A metal top 88 for the shell supports a refractory cover 90 for the shaft furnace. Outside of the shell 86 is mounted a layer of insulation 92, a fire brick layer 94, and a red brick covering layer 96. This construction of the furnace prevents the loss of heat, and at the same time permits an accurate control of the temperature within the reaction zone. The baffles 28 are made of refractory material preferably of a type which will not slag with the iron ore, particularly at the temperature of 2000° F.

The primary control of temperature in the furnace is obtained by thermocouples 97 which are suspended in the shaft 18 between each baffle 28. The thermocouples are preferably connected with potentiometers and electrical relays (not shown) for operating valves on the hydrogen and nitrogen gas supply lines, to control the gas supply in accordance with the temperatures in the shaft.

The vibration of the shakers 14 and 34 is carried out by means of a motor 98 which has an eccentric 100 connected by means of rods 102 and 104 with levers 106 and 108 respectively, which are connected with the hammers 22 and 36. These hammers give a vertical vibration to the powdered material in the shakers in order to keep a steady stream of falling particles passing through the shakers.

The cyclone separator is preferably well insulated so that the gases passing through the separator will be above the condensation temperature of steam which is separated from the ore and also formed by the reducing reaction. The temperature furthermore in the heat interchangers 50 and 62 is well above the condensation temperature of steam so that the steam formed will pass out of the heat interchangers through the outlets 54 and 56.

When the iron ores are reduced, the metallic values are heavier than the gangue or impurities associated with the ore, and preferably the velocity of gases upwardly through the shaft of the furnace is sufficient to carry the major portion of the gangue and unreduced ore out of the top of the shaft furnace and into the cyclone separator. This solid material will accumulate in the bottom of the separator 46 and by controlling a valve 110 at the bottom of the separator, the solids may be blown by the gases through a line 112 into the bin 10 to be mixed with the powdered ore that is being returned to the shaft furnace. If the solids are not high in iron values, they may be removed from the separator and discarded. Further if the solids contain valuable constituents such as phosphorous and zinc the solids may be recovered and separately treated to recover said materials.

The exhaust gas leaving the cyclone separator 46 is combustible and therefore the gas may be burned to heat the air and reducing gas heat interchangers if the gases entering the heat interchangers do not have sensible heat at a sufficiently high temperature to preheat the reducing gas and air to the desired temperature. Accordingly gas burners 116 are mounted in the bottom of the interchangers 50 and 62 in which all or a part of the gas passing through outlets 66 and 54 may be passed to the burners 116 to obtain the desired heating of the reducing gas and air. The valves for the burners 116 may be automatically controlled by the furnace temperature thermocouples 97.

The reduced ore bin 38 is preferably made air-tight to prevent oxidation of the metal, particularly the sponge iron, and this material may be removed from the bin through a sealing valve to be packed with the exclusion of air. Some of the lighter unreduced material accumulates at the side of the bin 38 and this material may be drawn through a pipe 114 by the powdered ore circulating blower to be again returned to the shaft furnace for retreatment. It will be understood that the powdered ore is forced through the line 12 by a blower (not shown) in which hydrogen or a reducing gas is used for conveying the powdered ore up to the shaker 14. Some titaniferous magnetite ores contain many other metal values other than iron, such as titanium, chromium, manganese, vanadium, aluminum and magnesium. These other metal values may be separated from the sponge iron by the well-known magnetic separator. At the low temperatures in the furnace, metal oxides such as titanium dioxide and magnesium, manganese, aluminum and vanadium oxides are not reduced so that these oxides are separated chemically.

The preferred form of the invention having been thus described, what is claimed as new is:

1. A process of reducing iron ore comprising pulverizing the ore to a fineness 100–500 mesh, causing the ore particles to fall through a vertical reaction zone, while maintaining a temperature of 1700°–2000° F. in the mid portion of the vertical zone, passing a reducing reacting gas upwardly through the vertical zone concurrent to the downward movement of the ore particles at a volume and velocity to retain the ore within the zone until reduced, and cooling the reduced ore passing out of the zone in a reducing gaseous atmosphere.

2. A process of reducing iron ore as defined in claim 1 in which the ore particles are distributed throughout the major portion of the reaction zone by baffles deflecting the ore out of contact with the wall defining the reaction zone.

3. A process of reducing iron ore as defined in claim 1 in which the ore particles are distributed throughout the major portion of the reaction zone while being held out of contact with the wall defining the reaction zone by causing the ore to sift through a sieve having a distributing area which holds the falling particles away from the walls of the reaction zone.

4. A process of reducing iron ore as defined in claim 1 in which the ore particles are distributed throughout the major portion of the reaction zone while being held out of contact with the wall defining the reaction zone in which the iron ore is sifted through a sieve having a distributing area which holds the falling particles away from the walls of the reaction zone in which the fine particles are maintained under a violent reciprocating movement in being fed through the sieve.

5. A process of reducing iron ore as defined in claim 1 in which the reducing gas in the upper zone is one of the group consisting of hydrogen, carbon monoxide and water gas, and is preheated from 500° to 1000° F. before being introduced into contact with the iron ore powder.

6. A process of reducing iron ore as defined in claim 1 in which the reduced metal products are broken up and sifted before being discharged from the lower reaction zone.

7. A process of reducing iron ore as defined in claim 1 in which the volume and velocity of reducing and inert gases passing upwardly through the first reaction zone act to carry out of the reaction zone a large portion of non-metallic gangue and unreduced ore, the unreduced ore being separated from the gases and returned to the reaction zone.

8. A process of reducing iron ore as defined in claim 1 in which an induced suction is maintained at the top of the reaction zone for removing gases, gangue and unreduced ore.

9. A process of reducing iron ore as defined in claim 1 in which the reduced ore material leaving the high temperature of the upper reaction zone passes downwardly through a second reaction zone and is cooled with nitrogen in the presence of hydrogen.

10. An apparatus for reducing iron ore comprising a tall vertical shaft furnace, a distributor mounted in the top of the furnace, means to introduce powdered iron ore into the distributor, means to vibrate the distributor to discharge pulverized ore as a falling stream of a cross area smaller than the cross-sectional area of the furnace to keep the ore from contacting the vertical walls of the furnace, valved lines for introducing a reducing gas circumferentially into the mid portion of the shaft, valved lines for introducing an inert cooling gas into the bottom portion of the shaft, a sifter mounted at the bottom of the shaft, means for reciprocating the sifter to break up reduced ore entering the sifter, a gas outlet at the top of the shaft for the rising furnace gases, and means for inducing a circulation of the gases through the outlet.

11. The iron ore reducing furnace defined in claim 10 in which baffles are positioned at intervals in the furnace shaft to direct falling powdered ore into the central portion of the shaft.

12. The iron ore reducing furnace defined in claim 10 in which hot exhaust gas from the furnace is conducted through a dust separator and then through a heat interchanger, and means for conducting a reducing gas through the heat interchanger to preheat the gas before it is introduced into the shaft.

13. The iron reducing furnace defined in claim 10 in which valves in the lines supplying the reducing and inert gas are controlled by thermocouples in the shaft to maintain a desired reducing temperature in the shaft.

14. The iron reducing furnace defined in claim 13 in which a cooling coil is mounted around the shaft furnace to control the temperature of the shaft lining.

15. The method of reducing iron ore comprising the steps of pulverizing the ore to a fineness of 100 to 500 mesh, passing the pulverized ore downwardly within a restricted sealed vertical shaft, maintaining an ore reducing zone adjacent the upper portion of the shaft at temperatures between 1700° F. and 2000° F., contacting the falling ore within said zone with an upward stream of a heated reducing gas of a sufficient volume and velocity to retain the ore within the zone until reduction thereof takes place, subjecting the metallized particles passing through the zone to a cooling volume of nitrogen, collecting the metallized particles at the bottom of the shaft, and withdrawing the gases and suspending ore and gangue from the top of the shaft.

References Cited in the file of this patent

UNITED STATES PATENTS

| 171,812 | Hunter | Jan. 4, 1876 |
| 290,115 | Russell | Dec. 11, 1883 |
| 865,658 | Scott | Sept. 10, 1907 |
| 2,638,414 | Lewis | May 12, 1953 |